United States Patent [19]

Whetten et al.

[11] 4,031,396

[45] June 21, 1977

[54] X-RAY DETECTOR

[75] Inventors: Nathan Rey Whetten, Burnt Hills; John M. Houston, Schenectady, both of N.Y.

[73] Assignee: General Electric Company, Schenectady, N.Y.

[22] Filed: Sept. 26, 1975

[21] Appl. No.: 616,930

Related U.S. Application Data

[63] Continuation-in-part of Ser. No. 554,171, Feb. 28, 1975, abandoned.

[52] U.S. Cl. .............................. 250/385; 250/374; 250/389; 313/93
[51] Int. Cl.² .......................................... G01T 1/18
[58] Field of Search .................. 250/374, 385, 389; 313/93

[56] References Cited

UNITED STATES PATENTS

| | | | |
|---|---|---|---|
| 2,696,564 | 12/1954 | Ohmart | 250/389 |
| 2,873,399 | 2/1959 | Garrison | 313/93 |
| 3,373,283 | 3/1968 | Lansiart et al. | 250/389 |
| 3,385,988 | 5/1968 | Hyun | 313/61 |
| 3,418,474 | 12/1968 | Spergel et al. | 313/93 |
| 3,509,339 | 4/1970 | Doehner | 250/366 |
| 3,614,437 | 10/1971 | Allemand | 250/385 |
| 3,704,284 | 11/1972 | Garmire | 250/385 |
| 3,898,465 | 8/1975 | Zaklad et al. | 250/385 |
| 3,930,162 | 12/1975 | Reiss | 250/385 |

Primary Examiner—Harold A. Dixon
Attorney, Agent, or Firm—Jack E. Haken; Joseph T. Cohen; Jerome C. Squillaro

[57] ABSTRACT

An ionization chamber for use in determining the spatial distribution of x-ray photons in tomography systems comprises a plurality of substantially parallel, planar anodes separated by parallel, planar cathodes and enclosed in a gas of high atomic weight at a pressure from approximately 10 atmospheres to approximately 50 atmospheres. The cathode and anode structures comprise metals which are substantially opaque to x-ray radiation and thereby tend to reduce the resolution limiting effects of x-ray fluoresence in the gas.

In another embodiment of the invention the anodes comprise parallel conductive bars disposed between two planar cathodes.

Guard rings eliminate surface leakage currents between adjacent electrodes.

19 Claims, 8 Drawing Figures

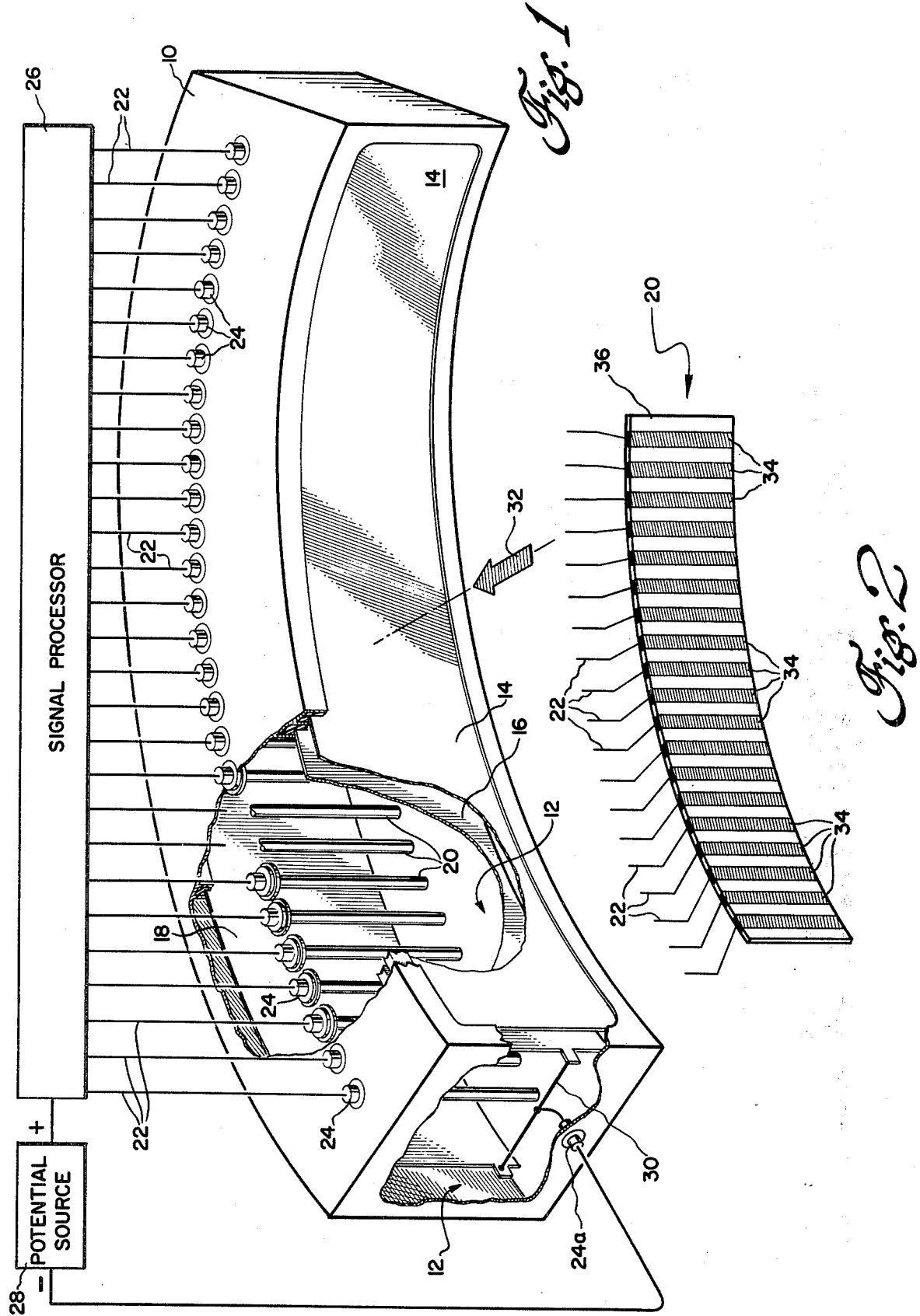

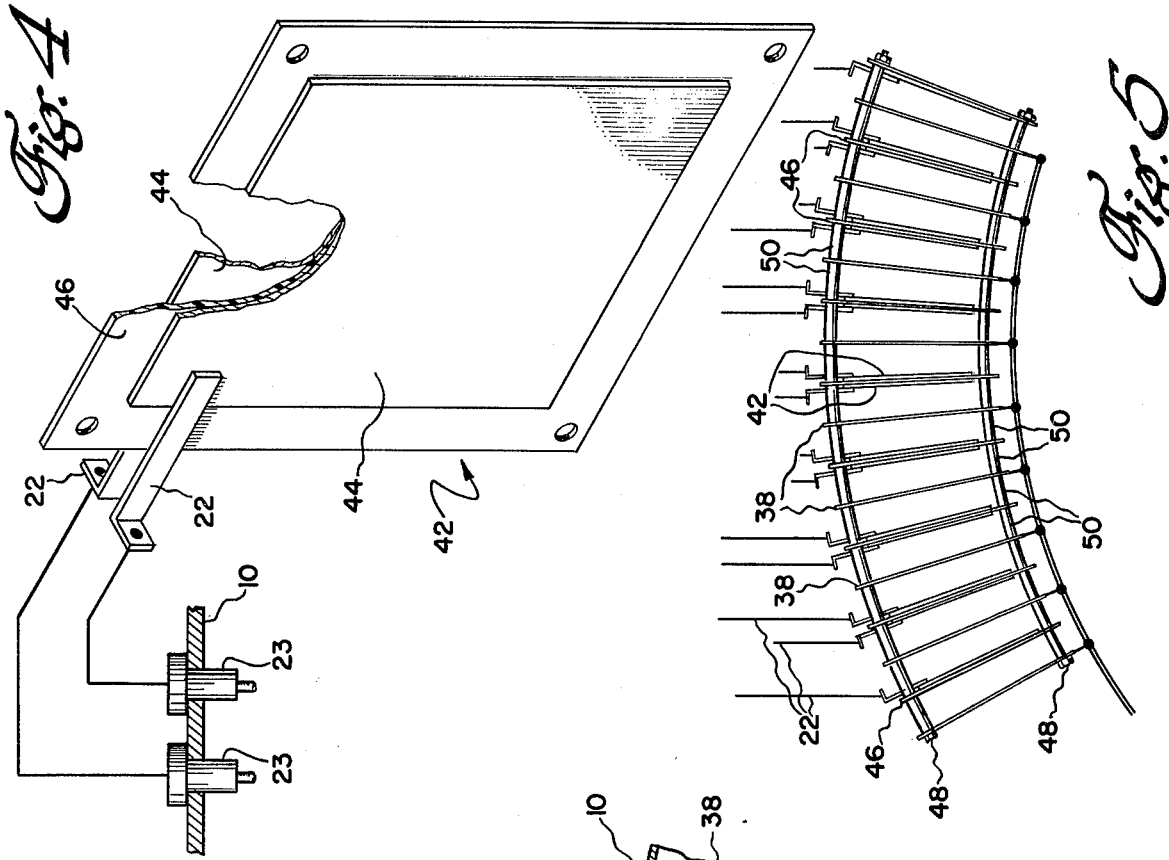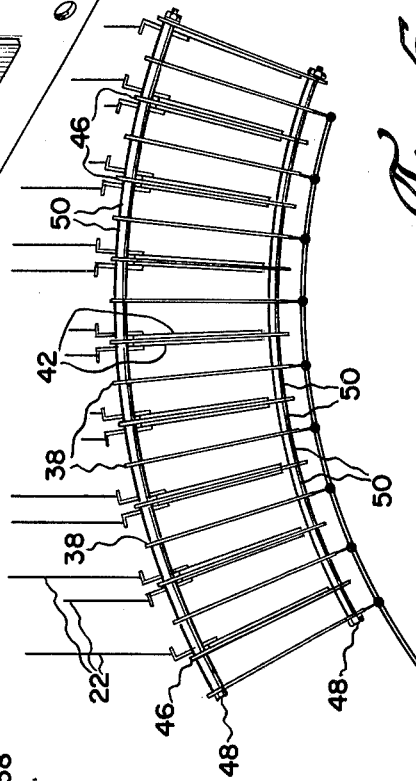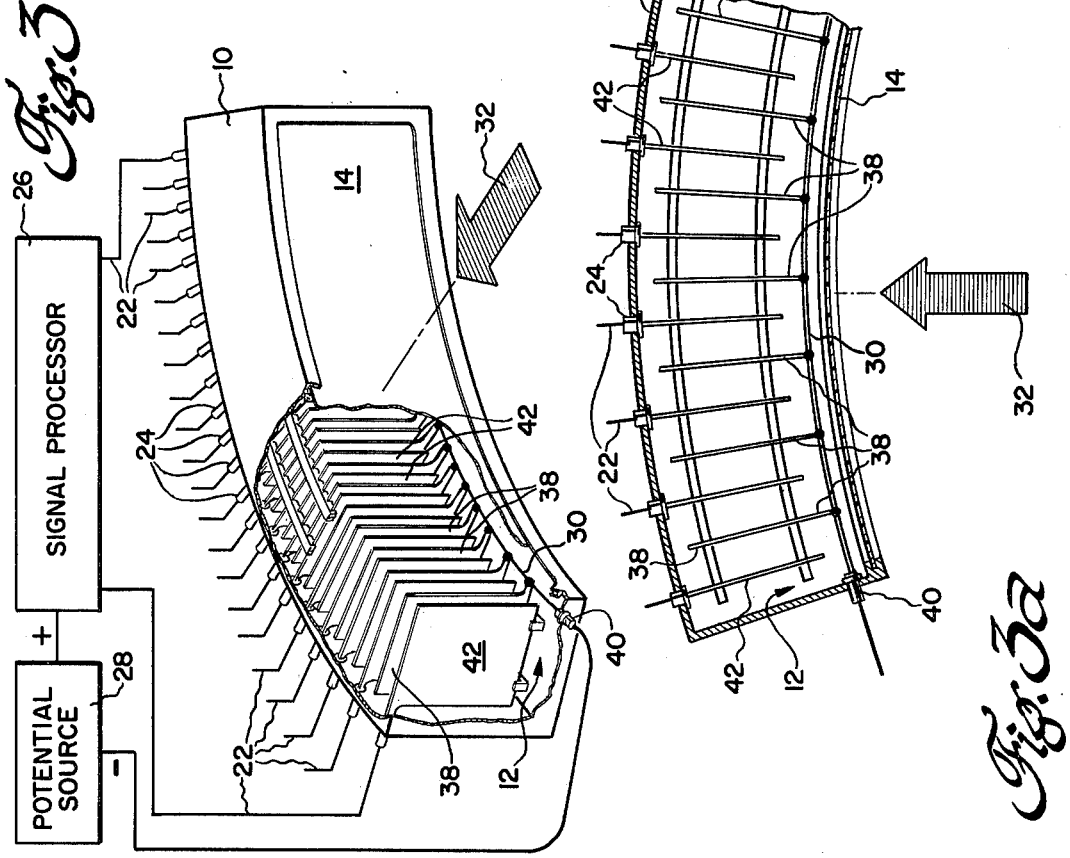

X-RAY DETECTOR

This is a continuation-in-part of U.S. patent application Ser. No. 554,171 filed Feb. 28, 1975, and now abandoned.

BACKGROUND OF THE INVENTION

This invention relates to ionization chamber, x-ray detectors. More specifically, this invention relates to multicellular detectors comprising high pressure gas for use in computerized tomography systems.

In a computerized, x-ray tomograph a spatial distribution of x-ray intensities must be translated into electrical signals which are processed to yield image information. Detectors for use in such systems must efficiently detect x-ray, electromagnetic energy with a high degree of spatial resolution. The x-ray pulse repetition rate in tomograph systems is generally limited by the recovery time of the x-ray detectors. It is desirable, therefore, to utilize x-ray detectors characterized by fast recovery times, high sensitivity, and fine spatial resolution. Proposed x-ray tomography systems employ hundreds of such x-ray detectors. A multicellular construction, wherein multiple, spatially separated detection cells are incorporated in a single detector assembly, provides an economic means for the production of such systems.

SUMMARY OF THE INVENTION

In accordance with the present invention, x-ray electromagnetic radiation is detected in a high pressure gas of high atomic weight. X-ray photons interact with the gas to produce photoelectron-ion pairs in the presence of an electric field. The electrons thus produced are collected on an array of positively charged electrodes to produce electric currents in proportion to the x-ray intensity in the vicinity of the electrodes. In one embodiment of the invention the positive electrodes comprise a linear array of parallel metal rods disposed midway between a pair of flat, parallel, negative electrodes.

The electrons and positive ions which are produced by the interaction of the x-ray photons and the gas drift along the electric field lines and are collected respectively on the positive and negative electrodes. Substantially all of the electrons and ions produced by the interaction of an x-ray pulse with the gas must be collected and removed from the detector before a subsequent x-ray pulse may be unambiguously detected. High pulse repetition rates are required for efficient computerized tomography so that detectors with short ion-electron collection times are desirable for use in such equipment. One embodiment of the present invention comprises a high pressure ionization chamber having a plurality of closely spaced parallel plate electrodes which lie substantially parallel to an incident x-ray beam. This electrode configuration allows prompt removal of the electron-ion pairs and permits the use of high x-ray pulse repetition rates at relatively low electrode potentials.

Heavy gas atoms, which are used in the ionization x-ray detectors of the present invention, tend to fluoresce; radiating photons at low energy, x-ray frequencies. These low energy, x-ray photons have a relatively long range in the detector gas and tend to degrade detector spatial resolution. The parallel plate electrodes of the present invention may be constructed of high atomic weight material which acts to absorb those low energy, secondary photons at the detector cell boundaries and, thus, improve the spatial resolution of the detector.

Highly efficient x-ray detectors are required to make maximum use of the information available from each x-ray exposure and to thereby minimize the total radiation exposure. Tomography detectors must, therefore, detect at least 50 percent of incident x-ray photons. Safe and efficient system operation typically requires detectors capable of detecting more than 70 percent of the incident x-ray beam which typically has an energy in the range from 30 to 100 KEV.

It is, therefore, an object of this invention to provide a multicellular, high pressure x-ray detector having high efficiency.

Another object of this invention is to provide a high pressure, ionization chamber x-ray detector having a short recovery time as compared to prior art detectors.

Another object of this invention is to provide a high pressure, ionization chamber x-ray detector having improved spatial resolution as compared to prior art detectors.

Another object of this invention is to provide a multicellular detector which is insensitive to the resolution limiting effects of gas fluorescence.

Yet another object of this invention is to provide multicellular x-ray detectors which are suitable for use in high speed, computerized, x-ray tomography systems.

BRIEF DESCRIPTION OF THE DRAWINGS

The novel features believed characteristic of the present invention are set forth in the appended claims. The invention itself, together with further objects and advantages thereof, may best be understood with reference to the following detailed description taken in connection with the appended drawings in which:

FIG. 1 is an embodiment of a detector of the present invention incorporating parallel, metal bar anodes;

FIG. 2 is an alternate embodiment of an anode structure for use in the detector of FIG. 1;

FIG. 3 is another embodiment of a detector of the present invention which incorporates parallel plate cathodes and anodes;

FIG. 3a is a top view of the detector embodiment of FIG. 3;

FIG. 4 is an alternate embodiment of an anode structure for the detector of FIG. 3;

FIG. 5 is a structure incorporating the anodes of FIG. 4 in a detector of the type indicated in FIG. 3a.

DESCRIPTION OF THE PREFERRED EMBODIMENT

Figure 6:
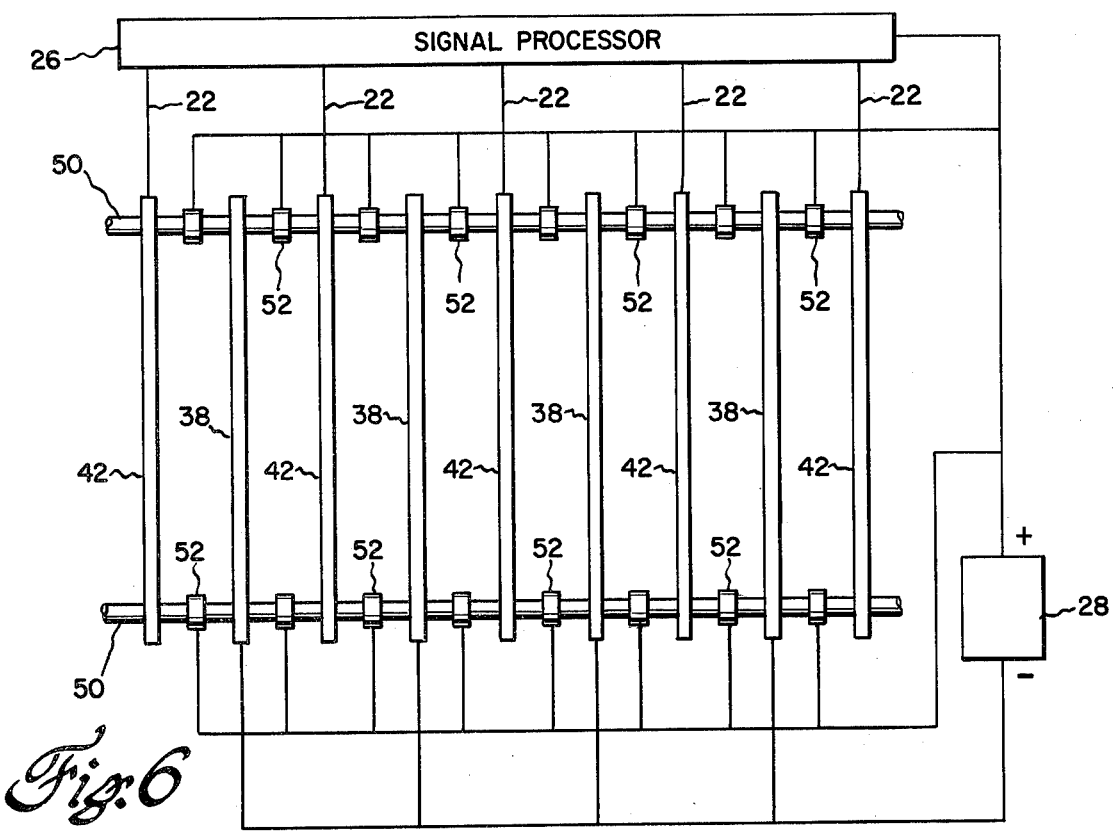
FIG. 6 is an alternate electrode embodiment for use in the detector of FIG. 3.

X-ray photons will interact with atoms of a heavy detector gas to produce electron-ion pairs. The x-ray photons are, generally, absorbed by a gas atom which emits a photoelectron from one of its electronic levels. The photoelectrons move through the gas interacting with and ionizing other gas atoms to produce a shower of electrons and positive ions which may be collected on suitable electrodes to produce an electric current flow. If, for example, xenon gas at approximately 10 atmospheres pressure is irradiated with 60 KEV x-ray photons, photoelectrons will be ejected from the 34.5 KEV xenon $k$ shell at approximately 25.5 KEV. The 25.5 KEV photoelectrons, having a range of approximately 0.1 mm in the xenon, will produce approximately 800 electron-ion pairs each. If these electron-ion pairs are produced in a region between two electrodes of opposite polarity, they will drift along electric field lines to the electrodes and yield a net electric current flow between them. The electric current flow between the electrodes is thus a function of the total number of x-ray photons interacting in the vicinity of those electrodes.

The probability of detection of an x-ray photon is a function of the atomic number of the gas and of the number of gas atoms lying between the collector electrodes. Thus, high sensitivity detectors may be constructed from a gas of high atomic weight at a relatively high pressure. Detector sensitivity may also be increased by increasing the spacing, and therefore the number of gas molecules, between the electrodes. Increased electrode spacing, however, increases the distance the electron-ion pairs must drift for collection and thus tends to increase the recovery time of the detector. An increased electric field gradient between the electrodes will tend to increase the electron-ion drift velocity and thus somewhat shorten the detector recovery time; the drift velocity, however, increases in relatively small proportion with electrode voltage increases. Furthermore, it is well known that an excessive electric field gradient will cause avalanche gas breakdown and will create highly nonlinear responses in detection sensitivity.

The detectors of the present invention operate with electric field gradients which are insufficient to cause electron multiplication: that is, they may be characterized as ionization chambers and not as proportional counters. The production of electron-ion pairs described above is attributable solely to energy transfer from the ejected $k$-shell photoelectrons and is not caused by collisions of electrons or ions moving under the influence of the impressed electric field. The values of electric field gradients which are suitable for use in ionization chamber detectors are well known in the art and are more fully described in *Medical Radiation Physics*, W. R. Hendee, Year Book Medical Publishers, Chicago, at chapters 4 and 17. The detectors of the present invention operate with electric field gradients between approximately 10 and approximately 1000 v/mm.

An $l$-shell electron will generally drop to fill the opening which is produced by the emission of the $k$ shell photoelectron from a heavy gas atom. The energy difference resulting from the drop of the electron from the $l$ to the $k$ shell levels is radiated in the form of a secondary x-ray photon. In xenon gas, for example, the $l$ to $k$ energy level shift produces 29 KEV x-ray photons. The range of these secondary photons in the high pressure gas is generally much larger than the range of the photoelectrons. By way of example, in xenon at 10 atmospheres pressure 25.5 KEV photoelectrons have a range of approximately 1 mm while 29 KEV x-ray photons have a range of approximately 20 mm.

The secondary photons which are produced by the fluorescence of the heavy gas atoms upon excitation by incident x-ray photons will be absorbed by other heavy gas molecules in the detector and are indistinguishable from the incident x-ray photons. Thus, photons which are produced by fluorescence in the region of one electrode cell may travel through a multicell detector to the region of another electrode cell where they will be detected in the same manner as incident x-rays. The $k$-shell fluorescence effect may, therefore, be seen to contribute to the degradation of spatial resolution in multicell, ionization chamber detectors.

FIG. 1 illustrates an embodiment of a multicell, x-ray detector the present invention. A pressure vessel 10 contains a detector gas 12 at high pressure. One side of the pressure vessel 10 defines a thin window 14 which is substantially transparent to electromagnetic radiation at x-ray frequencies. The window 14 may be constructed from any of the materials which are well known and commonly used for that purpose in the radiation detection arts; for example, aluminum, plastic resin, or a matrix of plastic resin reinforced by low atomic number metals. The term "substantially transparent", as used herein, means that the probability of x-ray radiation interacting with the window material is much less than the probability of that x-ray radiation interacting with the detector gas 12.

The detector gas 12 fills the pressure vessel 10 and is chosen to be substantially opaque to electromagnetic radiation at x-ray frequencies. As used herein, the term "substantially opaque" means that the probability of x-ray radiation interacting with the detector gas 12 is much greater than the probability of that electromagnetic radiation interacting with the window 14. The gas type, gas pressure, and electrode spacing are chosen using methods well known to the art so that a large fraction (typically more than 70 percent) of the incident x-ray photons are absorbed within the gas. The detector gas 12 may, typically, comprise a rare gas of high atomic number, for example, xenon, krypton, argon, or a molecular gas comprising atoms having an atomic weight greater than that of argon (i.e., 39.9); at a pressure from approximately 10 atmospheres to approximately 50 atmospheres.

A first cathode 16 is positioned within the pressure vessel 10 substantially parallel to the window 14. The first cathode 16 is constructed from conductive materials which are substantially transparent to electromagnetic radiation at x-ray frequencies; for example, aluminum or other low atomic number metals. A second cathode 18 is similarly positioned within the pressure vessel, parallel to and spaced apart from the first cathode 16. The second cathode may be constructed from any conductive material and need not be transparent to x-ray electromagnetic radiation. By way of illustration only, in a typical detector the second cathode 18 is spaced approximately 2.5 cm from the first cathode 16.

A plurality of anodes 20, which comprise a row of parallel, conductive bars, are positioned midway between and parallel to the first cathode 16 and the second cathode 18. Each of the plurality of anodes 20 is associated with a connecting lead 22 which passes through the pressure vessel 10 on an insulating feedthrough 24. The connecting leads 22 serve to transmit electric current signals from the anodes 20 to a signal processing circuit 26 which may be positioned external to the pressure vessel 10. The first cathode 16 and the second cathode 18 are electrically connected in parallel by a cathode lead 30 which passes through the pressure vessel 10 on an insulating feedthrough 24a. A source of direct current electric potential 28 is connected in series between the cathode lead 30 and the anodes 20 to produce an electric field between the anodes 20 and the cathodes 16 and 18. In typical detectors of the present invention the electric field gradient is between approximately 100 and approximately 300 v/mm.

Incident x-rays 32 enter the detector through window 14 in a direction substantially perpendicular to the plane of the first and second cathodes 16 and 18. The x-rays interact with the atoms of gas 12 to produce electron-ion pairs which drift along the electric field to produce current flow between the anodes 20 and the cathodes 16 and 18. The current flow from a particular anode 20 is associated with and proportional to the number of x-ray-gas interactions occurring in the vicinity of that electrode. The signals from the anodes may be combined in the signal processor 26, using techniques well known to the tomography art, to yield an image from the x-ray intensity along the line of anodes.

This embodiment of detector yields high sensitivity and relatively fast response time. Electron-ion pairs produced between the anodes and cathodes must traverse only half the distance separating the first cathode from the second cathode. The volume of gas 12 available for the detection of x-rays in the vicinity of a particular anode 20 is equal to the sum of the volume of gas lying between that anode and the first cathode 16 and the volume of gas lying between that anode and the second cathode 18. The volume of gas available for detection is thus twice that available in a simple planar detector.

Another embodiment of an anode structure 20 suitable for use in the detector of FIG. 1 is illustrated in FIG. 2. In this embodiment the anodes comprise a row of parallel metal strips 34 disposed on the surface of a sheet of dielectric material 36. The dielectric sheet 36 may be constructed, for example, from ceramic, mica, plastic resin, or any other material of the type commonly used for this purpose in the electrical arts. The metal strips 34 may be attached to the dielectric sheet 36 in any conventional manner, for example, by vapor deposition, by screen printing, or by adhesive bonding. Lead wires 22 are bonded to the individual metal strips 34 and pass through the pressure vessel 10 in the manner described above.

FIGS. 3 and 3a illustrate another embodiment of the detector of the present invention. A pressure vessel 10 having an x-ray transparent window 14 is filled with a detector gas 12 in the manner and of the type described above. A plurality of flat anodes 42 are aligned within the pressure vessel 10 in a direction substantially perpendicular to the window 14. The anodes 42 are individually connected to a plurality of leads 22 which pass through the pressure vessel on dielectric feedthroughs 24. A metal plate cathode 38 is positioned equidistant between each of the anodes 42. The cathodes 38 are connected in parallel by a lead 30 which passes through the pressure vessel 10 on a dielectric feed-through 40.

The anode plates 42 and the cathode plates 38 are constructed from metals which are substantially opaque to electromagnetic radiation at x-ray frequencies. Metals of high atomic number, for example, molybdenum, tantalum, or tungsten, are suitable for use as the anodes 42 and the cathodes 38. By way of illustration only, in a typical detector the anode and cathode plates are constructed from 0.05 mm molybdenum or tungsten sheets. The cathode lead 30 and the anode leads 22 are electrically connected to a signal processor 26 and a potential source 28 in the manner described above.

Photons of x-ray radiation 32 enter the detector through the window 14 in directions substantially parallel to the anode plates 42 and the cathode plates 38. The photons interact with the fill gas 12 in the regions between the anode plates 42 and the cathode plates 38. Electron-ion pairs which are produced by interaction of the gas 12 with the photons 32 drift along electric field lines between the anodes and cathodes and are collected thereon to produce electric current signals. The electric current flowing from a particular anode 42 is proportional to the number of x-ray photons interacting with the gas 12 in the space between that anode and the adjacent pair of cathodes 38.

This embodiment of the detector is insensitive to the resolution limiting effects of k-band x-ray fluorescence. Any x-ray photons which are produced by fluorescence in the region between an anode plate 42 and a cathode plate 38 must pass through a cathode plate 38 before they would be capable of producing electron-ion pairs which would drift to an adjacent anode. As indicated above, the cathode plates 38 are constructed from material which is substantially opaque to x-ray photons and the incidence of fluorescent x-ray photons with sufficient range to produce current in adjacent anode cells is thereby greatly reduced. The anode 42 and cathode 38 structures of the present embodiment lie parallel to the direction of photon incidence. The plates of the anodes 42 and the cathodes 38 may, therefore, be spaced relatively close together yielding a detector with a short recovery time, while the length of the plates may be increased to produce a detector of high sensitivity. By way of illustration only, in a typical detector, the anode and cathode plates are mounted on 2 mm centers. The parallel electrode plates of this detector embodiment also serve to absorb incident photons which are scattered from external objects (i.e., tissue under examination) and which enter the detector at an oblique angle.

FIG. 4 illustrates an alternate embodiment of the anode plates 42 which may be utilized in the detector of FIG. 3. In this embodiment, each anode plate comprises a thin dielectric sheet 46; which may, by way of illustration, be constructed from ceramic, mica, or Mylar$^{TM}$ plastic resin sheet. A pair of electrodes 44, constructed from metal which is substantially opaque to electromagnetic radiation at x-ray frequencies, are disposed on opposite sides of the dielectric sheet 46. Separate leads 22 are connected to each metal electrode 44 and pass through the pressure vessel 10 on separate dielectric feed-throughs 23. Electron currents flowing to opposite sides of the anode plate 42 are thus collected on the separate metal sheets 44 and transmitted separately to the signal processor 26 (of FIG. 3). The spatial resolution of the detector is thereby increased by a factor of two.

A method of construction of an assembly of anode and cathode plates is illustrated in FIG. 5. The anode plates 42 and the cathode plates 38 are alternately stacked on a plurality of insulating bolts 48. A series of tubular insulators 50 are threaded on the bolts 48 between the anode plates 42 and the cathode plates 38 and serve to position the plates. The plates may be mounted in parallel alignment for detection of a collimated x-ray beam or the thickness of the insulators 50 may be varied to produce a curved plate alignment suitable for detection of a diverging x-ray beam.

The electron-ion current flowing within these ionization chambers is typically very small and may be of the same order of magnitude as leakage currents which flow on the structures. These leakage currents which may induce noise in or interfere with the operation of detector amplifier electronics may be drained from the detector circuit on guard rings which are spaced on the electrode support structures between adjacent electrodes and are operated at anode potential.

FIG. 6 is an alternate embodiment of electrode structures for use in the detector of FIG. 3. Guard ring elements 52 are disposed on support rods 50 between the cathode plates 38 and the anode plates 42 to drain surface leakage currents which might otherwise flow between them. Guard rings are connected to the positive terminal of the potential source 28 in parallel with the signal processor 26.

Figure 7:
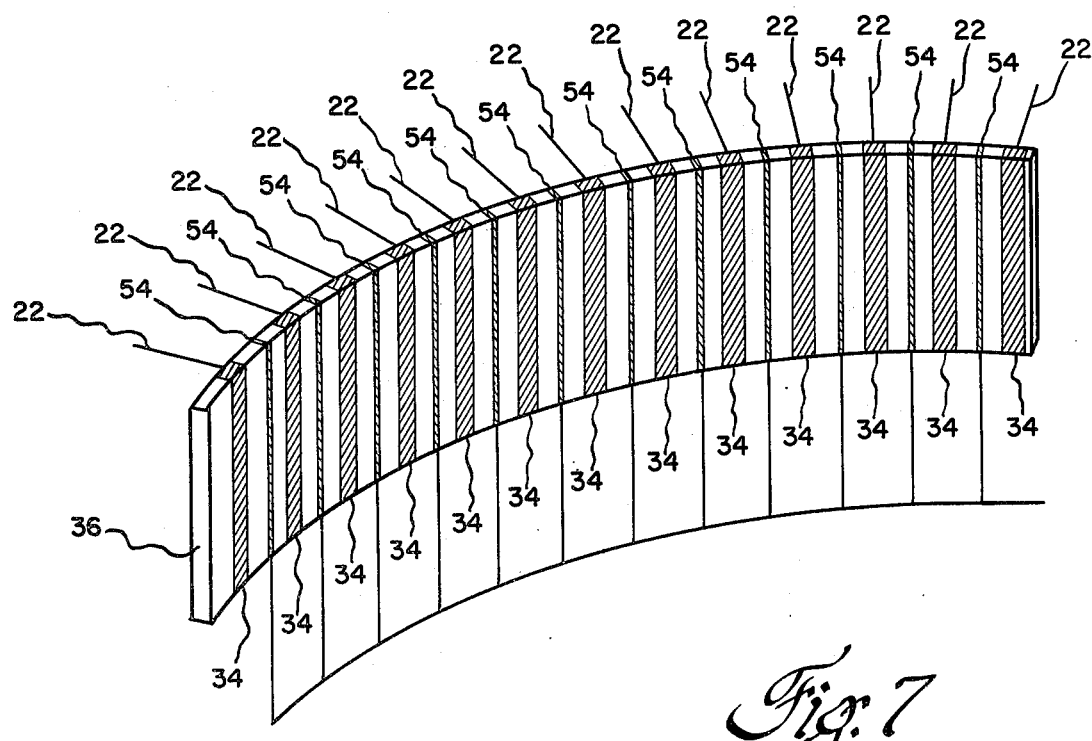
FIG. 7 is an alternate anode embodiment for use in the detector of FIG. 1.

FIG. 7 is an alternate embodiment of the anode of FIG. 2 which incorporates guard ring elements 54 which are disposed on the dielectric sheet 36 between adjacent anode strips 34. The guard rings are connected and function to drain surface leakage currents in the manner described above.

It may, therefore, be seen that the present invention provides x-ray detector structures which produce electrical signals in response to a linear space distribution of x-ray intensities. The structures allow the construction of detectors having high sensitivity, short recovery time, and fine spatial resolution and which are relatively insensitive to the adverse effects of $k$ shell, x-ray fluorescence.

The electrodes in the descriptions of the preferred embodiments of the present invention have, for ease of description, been referred to as "cathodes" and "anodes". It is to be understood, however, that the polarity of the electric potentials applied to these detectors may be reversed without affecting the principles of operation of the disclosed invention and that the "anode" structures may be operated at an applied potential which is negative with respect to the "cathode" potential. The terms "cathode" and "anode" as used herein and in the appended claims mean electrodes of opposite polarity.

While the invention has been described in detail herein in accord with certain preferred embodiments, thereof, many modifications and changes therein may be effected by those skilled in the art. Accordingly, it is intended by the appended claims, to cover all such modifications and changes as fall within the true spirit and scope of the invention.

The invention claimed is:

1. An x-ray detector comprising:
   a gaseous medium of the type characterized as being substantially opaque to electromagnetic radiation at x-ray frequencies;
   a plurality of substantially planar sheet anodes, comprising material which is characterized as being substantially opaque to electromagnetic radiation at x-ray frequencies, disposed in said gaseous medium;
   a plurality of substantially planar sheet cathodes, comprising material which is characterized as being substantially opaque to electromagnetic radiation at x-ray frequencies, disposed in said gaseous medium, each of said cathodes lying approximately equi-distant between two of said anodes;
   means for applying direct current electric potential between said cathodes and said anodes;
   means for separately measuring the electric current flow from each of said anodes connected in series between said anodes and means for applying said potential; and
   a beam of x-ray photons disposed and directed to impinge on said gaseous medium in directions substantially parallel to the planes of adjacent said anode sheets and said cathode sheets.

2. The detector of claim 1 wherein said anodes are substantially parallel.

3. The detector of claim 1 wherein said anodes are spaced equi-distant, one from another.

4. The detector of claim 1 wherein each of said anodes comprises:
   a flat dielectric plate having two sides and
   two metallic electrodes disposed on the sides of said dielectric plate.

5. The detector of claim 1 further comprising a pressure vessel disposed about and containing said anodes, said cathodes, and said gaseous medium.

6. The detector of claim 5 wherein said pressure vessel further comprises a window perpendicular to said cathodes, said window being characterized as substantially transparent to electromagnetic radiation at x-ray frequencies.

7. The detector of claim 6 wherein said window comprises aluminum.

8. The detector of claim 6 wherein said window comprises plastic resin.

9. The detector of claim 1 wherein said gaseous medium comprises elements having an atomic weight greater than or equal to the atomic weight of argon.

10. The detector of claim 9 wherein the pressure of said gaseous medium is between approximately 10 and approximately 50 atmospheres.

11. The detector of claim 1 wherein said gaseous medium is a gas selected from the group consisting of argon, krypton, and xenon.

12. The detector of claim 1 wherein said source of electric potential is adapted to impress an electric field gradient between approximately 10 and approximately 1000 v/mm in the regions separating said anodes and said cathodes.

13. The detector of claim 1 wherein the magnitude of said source of electric potential is chosen to cause said detector to operate in the ionization chamber mode.

14. The detector of claim 1 further comprising dielectric support means disposed between said anodes and said cathodes and guard rings disposed on the surface of said support means between adjacent anodes and cathodes.

15. The detector of claim 1 wherein said anodes and said cathodes comprise materials selected from the group consisting of tantalum, tungsten, and molybdenum.

16. An x-ray detector comprising:
    a first cathode comprising a flat conductive sheet of material characterized as substantially transparent to electromagnetic radiation at x-ray frequencies;
    a second cathode disposed parallel to said first cathode;
    a plurality of anodes comprising parallel strips of conductive material disposed on a sheet of dielectric material in a plane lying equi-distant from said first cathode and said second cathode;
    a gaseous detecting medium disposed between said anodes and said first cathode and said second cathode, said medium being characterized as substantially opaque to electromagnetic radiation at x-ray frequencies;

guard ring elements disposed on said dielectric sheet between adjacent strips of said conductive material;

means for applying direct current electric potential between said cathodes and said anodes whereby an electric field is impressed between said cathodes and said anodes, and said detector is caused to operate in the ionization chamber mode; and means for connecting each of said anodes to a signal processing circuit.

17. An x-ray detector comprising:

a gaseous medium of the type characterized as being substantially opaque to electromagnetic radiation at x-ray frequencies;

a plurality of substantially planar anodes disposed in said gaseous medium;

a plurality of substantially planar cathodes disposed in said gaseous medium, each of said cathodes lying approximately equi-distant between two of said cathodes;

dielectric support means disposed between said anodes and said cathodes; and guard rings disposed on the surface of said support means between adjacent anodes and cathodes.

18. The detector of claim 17 wherein said anodes and said cathodes comprise material characterized as being substantially opaque to electromagnetic radiation at x-ray frequencies.

19. The detector of claim 17 wherein said anodes and said cathodes comprise material selected from the group consisting of tantalum, tungsten, and molybdenum.

* * * * *